United States Patent
Kawai et al.

(10) Patent No.: US 12,459,131 B2
(45) Date of Patent: Nov. 4, 2025

(54) PICKING SYSTEM

(71) Applicant: Mitsubishi Electric Corporation, Tokyo (JP)

(72) Inventors: Masaya Kawai, Tokyo (JP); Takehiro Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 120 days.

(21) Appl. No.: 18/550,391

(22) PCT Filed: Mar. 31, 2022

(86) PCT No.: PCT/JP2022/016572
§ 371 (c)(1),
(2) Date: Sep. 13, 2023

(87) PCT Pub. No.: WO2022/234752
PCT Pub. Date: Nov. 10, 2022

(65) Prior Publication Data
US 2024/0157567 A1    May 16, 2024

(30) Foreign Application Priority Data

May 6, 2021    (JP) ................. 2021-078318

(51) Int. Cl.
*B25J 9/16*    (2006.01)
(52) U.S. Cl.
CPC ........... *B25J 9/1697* (2013.01); *B25J 9/1612* (2013.01); *B25J 9/163* (2013.01); *B25J 9/1653* (2013.01)
(58) Field of Classification Search
CPC . B25J 13/08; B25J 9/1612; B25J 9/163; B25J 9/1653; B25J 9/1697;
(Continued)

(56) References Cited

U.S. PATENT DOCUMENTS

| 5,314,889 A | 5/1994 | Boigegrain et al. |
| 5,380,736 A | 1/1995 | Boigegrain et al. |

(Continued)

FOREIGN PATENT DOCUMENTS

| JP | H05155871 A | 6/1993 |
| JP | 2012245602 A | 12/2012 |

(Continued)

OTHER PUBLICATIONS

International Search Report (PCT/ISA/210) with translation and Written Opinion (PCT/ISA/237) mailed on Jun. 21, 2022, by the Japan Patent Office as the International Searching Authority for International Application No. PCT/JP2022/016572. (7 pages).

*Primary Examiner* — Wade Miles
*Assistant Examiner* — Zachary Joseph Wallace
(74) *Attorney, Agent, or Firm* — Buchanan Ingersoll & Rooney PC

(57) ABSTRACT

This picking system comprises: a workpiece posture calculator that calculates postures of workpieces from captured image data acquired from an imager, selects a workpiece to be picked, and determines a gripping position and an angle; a robot that grips and takes out the selected workpiece, on the basis of the determination by the workpiece posture calculator; a posture changing device that changes the posture of a grasped member; and a controller that, when the gripping position and the angle that are determined deviate from a gripping position and an angle that are set, causes the posture changing device instead to hold the workpiece gripped by the robot, and rotate the workpiece, and then causes the robot to grip again the workpiece so that the gripping position and the angle match the gripping position and the angle that are set.

20 Claims, 19 Drawing Sheets

(58) Field of Classification Search
CPC ........... G05B 2219/37555; G05B 2219/40053; G05B 2219/45063
See application file for complete search history.

(56) References Cited

U.S. PATENT DOCUMENTS

| | | | |
|---|---|---|---|
| 2017/0120402 A1 | 5/2017 | Inutake | |
| 2020/0233407 A1 | 7/2020 | Nagatani et al. | |
| 2022/0241982 A1* | 8/2022 | Oishi | G06T 7/50 |
| 2022/0270198 A1* | 8/2022 | Han | H04N 23/90 |
| 2023/0415353 A1* | 12/2023 | Oba | G05B 19/41825 |
| 2024/0300102 A1* | 9/2024 | Tago | B25J 9/1612 |

FOREIGN PATENT DOCUMENTS

| | | |
|---|---|---|
| JP | 2017080846 A | 5/2017 |
| JP | 2017124450 A | 7/2017 |
| JP | 2020034526 A | 3/2020 |
| WO | 2018173318 A1 | 9/2018 |

* cited by examiner

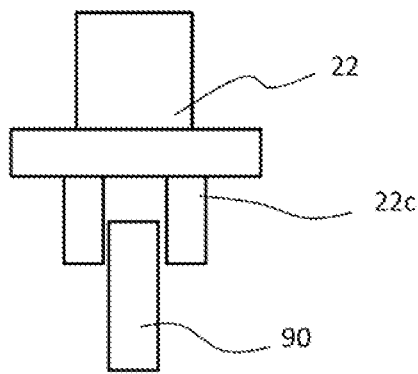
FIG. 4A
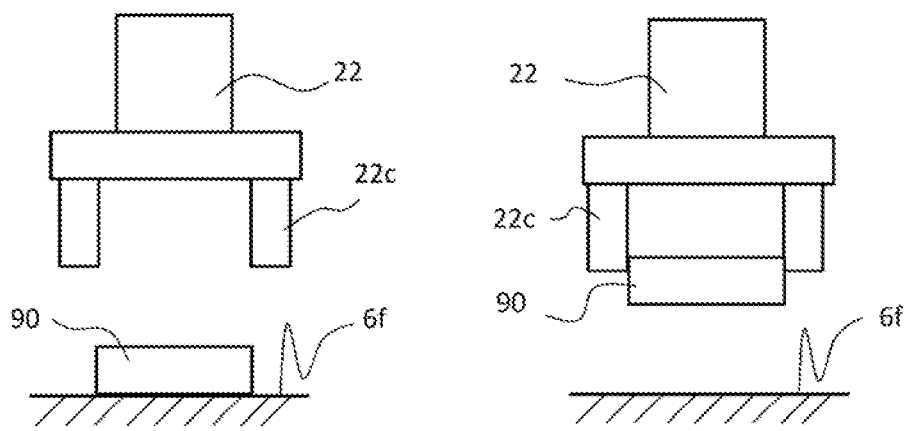
FIG. 4B
FIG. 4C

PICKING SYSTEM

TECHNICAL FIELD

The present application relates to a picking system.

BACKGROUND ART

In recent years, there has been a demand for a parts supply system that can cope with varied-product varied-volume production in response to diversified market needs. One of these is a picking system under development in which positions of workpieces stacked in bulk in a pallet or on a conveyor are measured by a vision sensor and a workpiece is picked with high accuracy by a robot.

For example, there is disclosed a pick-up device (refer to, for example, Patent Document 1) that detects the postures and directions of workpieces stacked in bulk using the upper portion of the workpieces stacked in bulk and a vision sensor attached to the tip of a robot and identifies a workpiece that can be taken out to take out the workpiece. Or a temporary placement apparatus (refer to, for example, Patent Document 2) is disclosed in which a deformable placement surface formed of a sheet is provided by which directions of the workpieces are made uniformed.

CITATION LIST

Patent Document

Patent Document 1: Japanese Patent Application Laid-Open No. 2017-124450 (paragraphs 0016 to 0043, FIG. 1 to FIG. 6)

Patent Document 2: Japanese Patent Application Laid-Open No. 2017-80846 (paragraphs 0016 to 0057, FIG. 1 to FIG. 8)

SUMMARY OF INVENTION

Problems to be Solved by Invention

However, only by detecting the posture and direction of the workpiece, although it is possible to select a workpiece that can be gripped, it is difficult to take out a workpiece in a posture that cannot be gripped. Further, when the shape of the placement surface is deformed, the direction of a workpiece does not necessarily change in a desired direction, and when the posture of the workpiece cannot be changed to an appropriate state, it is necessary to repeat the deformation many times, so that the processing time to be required is unpredictable, and there is also a problem in reliability.

The present application discloses a technique for solving the above-described problem, and an object of the present application is to obtain a picking system capable of reliably gripping a workpiece in a proper posture.

Means for Solving Problems

A picking system disclosed in the present application is provided with a workpiece posture calculation unit that includes an imaging unit for capturing images of workpieces stacked in bulk, calculates a posture of each workpiece from imaging data acquired from the imaging unit, selects a workpiece to be picked, and determines a gripping position and an angle, a robot that grips and takes out the selected workpiece on a basis of the determination by the workpiece posture calculation unit, a posture changing device that includes a chuck and a rotation unit for rotating the chuck and changes a posture of a member grasped by the chuck, and a control unit that causes, when the gripping position and the angle that are determined deviate from a gripping position and an angle that are set, the posture changing device instead to hold the workpiece gripped by the robot and to rotate the workpiece, and then causes the robot to grip the workpiece again so as to match the gripping position and the angle that are set.

Advantageous Effect of Invention

According to the picking system disclosed in the present application, since a workpiece supplied in a non-uniform posture is changed in a desired angle and held back again, the workpiece can be reliably gripped in a proper posture.

BRIEF DESCRIPTION OF THE DRAWINGS

FIG. 4A, FIG. 4B, and FIG. 4C are side views for describing an intended gripping posture for a rod-shaped workpiece, a state of a workpiece stacked in an unintended posture, and a state of the workpiece gripped in the unintended posture in the picking system according to Embodiment 1, respectively.

MODE FOR CARRYING OUT INVENTION

Embodiment 1

Figure 1:
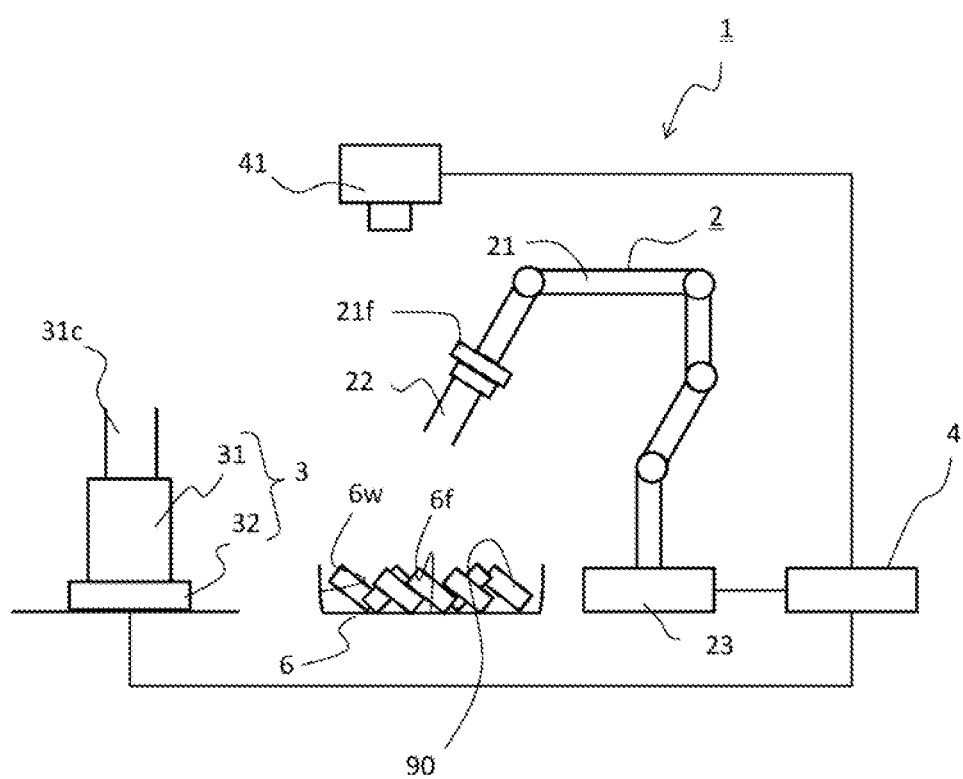
FIG. 1 is a schematic diagram for describing a configuration of a picking system according to Embodiment 1.

FIG. 1 to FIG. 12C are for describing a configuration and an operation of a picking system according to Embodiment 1. FIG. 1 is a schematic diagram for describing an entire configuration of the picking system, FIG. 2A and FIG. 2B each are a side view for describing a configuration of a gripping claw in a different shape, which is replaced in accordance with the shape of a workpiece and mounted on the tip of a robot arm, and FIG. 3A, FIG. 3B, and FIG. 3C are side views for describing configurations of workpieces to be picked, having different shapes, such as a rod-shape, a stepped shape, and an L-shape, respectively.

Figure 3A:
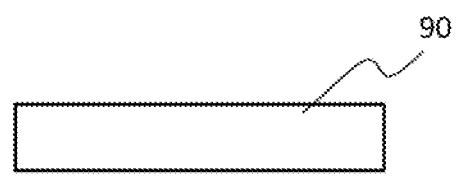
FIG. 3A to FIG. 3C each are a side view for describing a configuration of a workpiece having a different shape, which is an object to be picked by the picking system according to Embodiment 1.

FIG. 4A, FIG. 4B, and FIG. 4C are side views for describing a gripping posture in which the rod-shaped workpiece corresponding to FIG. 3A is gripped in an intended vertical direction, a state of a workpiece stacked in an unintended sideways posture, and a state in which a workpiece is gripped with the sideways posture kept respectively. FIG. 5A, FIG. 5B, FIG. 5C, and FIG. 5D are side views for describing a gripping posture for gripping the head intended for the stepped shape workpiece corresponding to FIG. 3B, a state of a workpiece stacked in a first unintended posture in which the head is on the lower side and a state in which a workpiece is gripped in a posture in which the head is kept on the lower side, and a state of a robot hand for gripping a workpiece laid sideways and stacked in a second unintended posture, respectively.

Figure 3B:
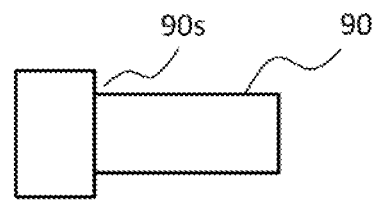
Figure 3C:
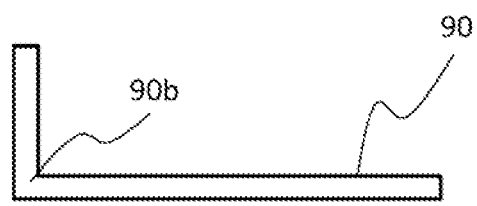
Figure 6A:
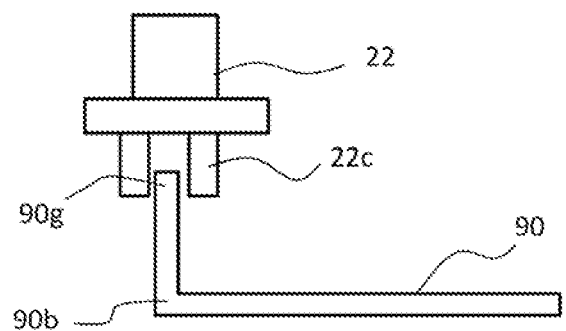
FIG. 6A, FIG. 6B, and FIG. 6C are side views showing an intended gripping posture, a state of a workpiece stacked in the intended posture, and a state of a workpiece stacked in an unintended posture with respect to an L-shaped workpiece in the picking system according to Embodiment 1, respectively.
Figures 6B, 6C:
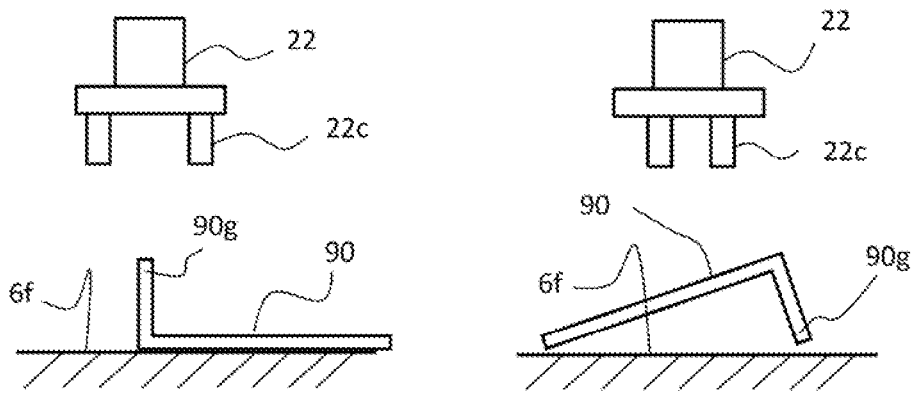

Further, FIG. 6A, FIG. 6B, and FIG. 6C are schematic side views showing, together with the robot hand, a gripping posture for gripping a short side of a L-shaped workpiece intended, corresponding to FIG. 3C, a state of the workpiece stacked in an intended posture with the short side facing upward, and a state of the workpiece stacked in an unintended posture with the short side facing downward, respectively.

Figure 7A:
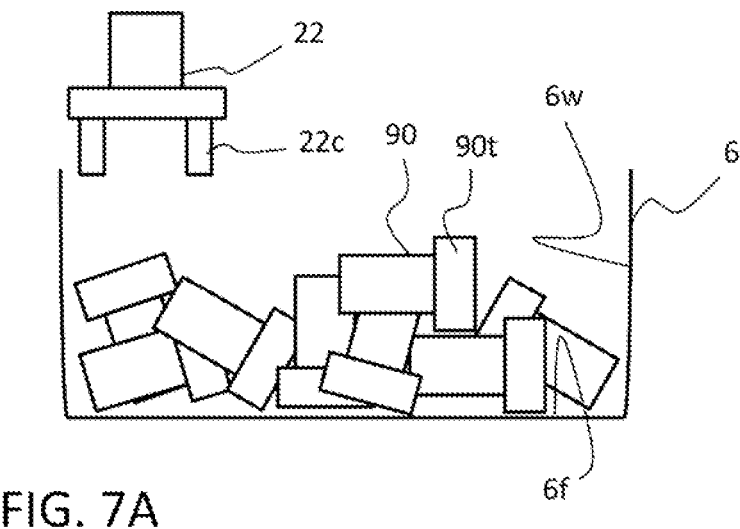
FIG. 7A and FIG. 7B are schematic side views for describing states in which two kinds of workpieces among workpieces to be picked in the picking system according to Embodiment 1 are individually stacked in bulk on a workpiece placement apparatus.
Figure 7B:
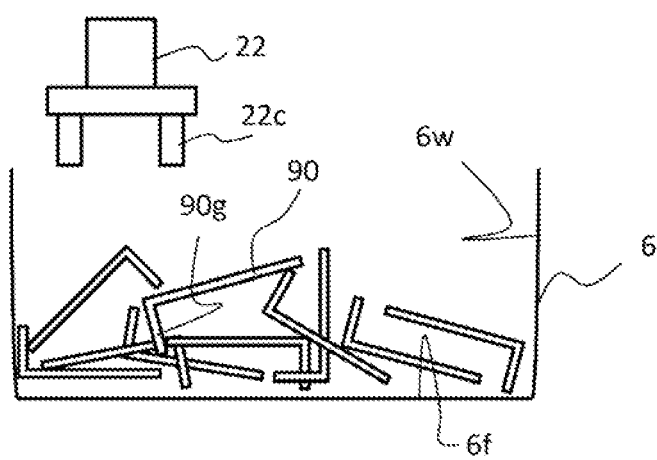
Figure 8A:
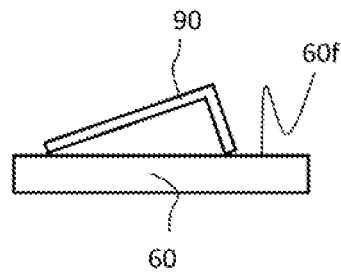
FIG. 8A to FIG. 8F each are a schematic diagram for describing a typical method for coping with a case where a workpiece that is not in an intended posture is placed on a workpiece placement apparatus.
Figure 8B:
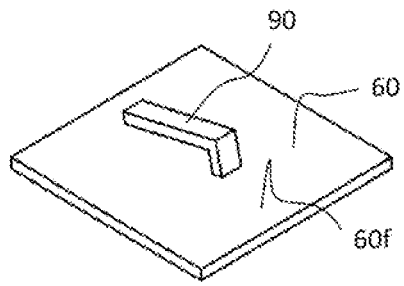
Figure 8C:
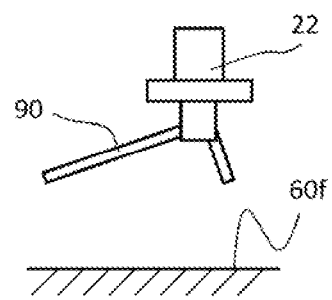
Figure 8D:
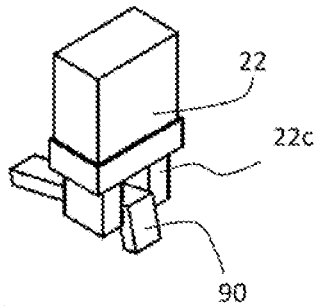

FIG. 7A and FIG. 7B are schematic side views showing, together with the robot hand, for describing a state in which stepped workpieces corresponding to FIG. 3B and L-shaped workpieces corresponding to FIG. 3C among the workpieces to be picked are stacked in bulk each on the workpiece placement apparatus. Furthermore, FIG. 8A to FIG. 8F are schematic views for describing a typical method for coping with cases when a workpiece having a shape shown in FIG. 3C is placed in a posture other than the intended posture, and FIG. 8A and FIG. 8B are a side view and a perspective view showing a state of a workpiece in a certain posture. FIG. 8C and FIG. 8D are a side view and a perspective view showing a state in which a workpiece in a certain posture is taken out in that posture, and FIG. 8E and FIG. 8F each are a perspective view showing a state in which the posture is changed.

Figure 9:
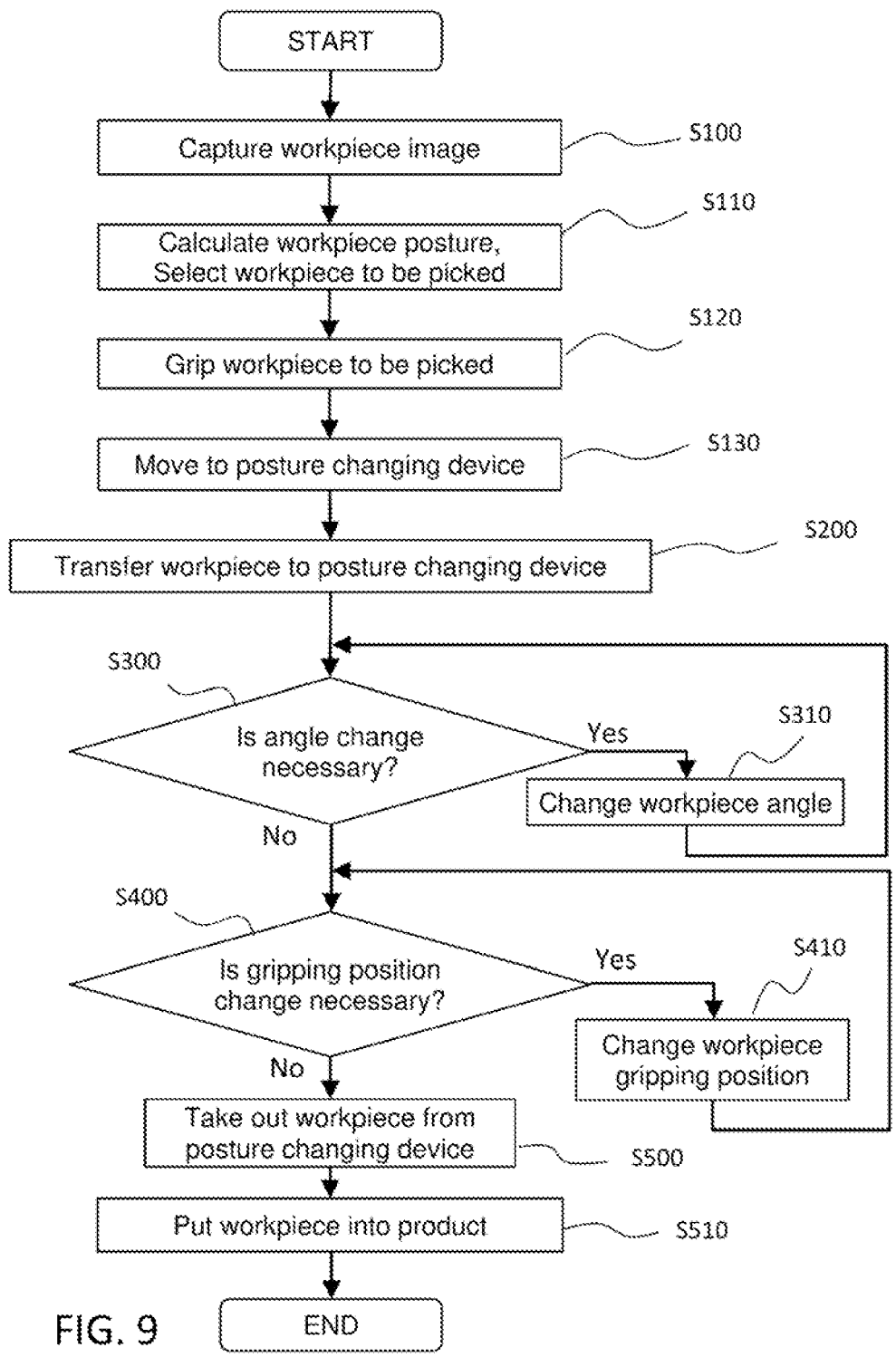
FIG. 9 is a flowchart for describing an operation of the picking system according to Embodiment 1.
Figure 10A:
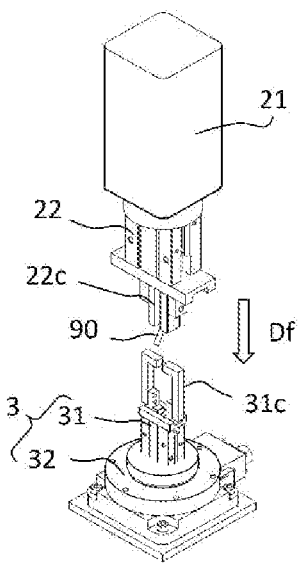
FIG. 10A to FIG. 10D are perspective views showing movements of a robot arm and a posture changing device at respective stages in an operation of changing a posture of a workpiece gripped in an unintended posture to that in an intended posture in the picking system according to Embodiment 1.
Figure 10B:
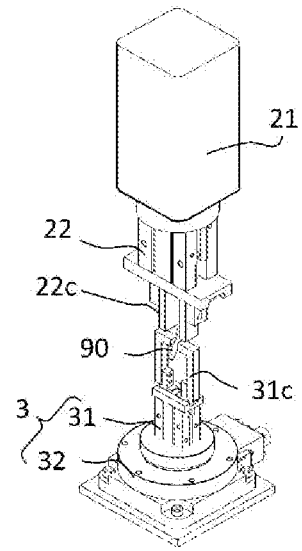
Figure 10C:
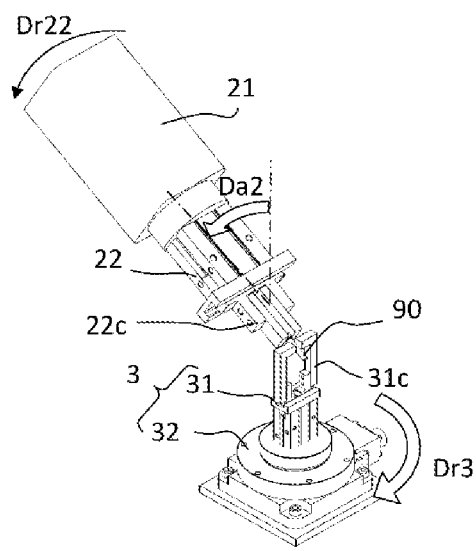

FIG. 9 is a flowchart for describing an operation of the picking system, and FIG. 10A to FIG. 10D are perspective views showing movements of positions and postures as the movements of the robot arm and a posture changing device at four respective stages in an operation of changing a posture of a workpiece gripped in an unintended posture to that in an intended posture. Further, FIG. 11A is a schematic side view for describing the movement of the position and the posture of the robot arm and the posture changing device to be described in FIG. 10A to FIG. 10D, and FIG. 11B is a schematic side view for describing the movement of the position and the posture of the robot arm and the posture changing device that correspond to FIG. 11A in the picking system according to a third variation.

Figure 12A:
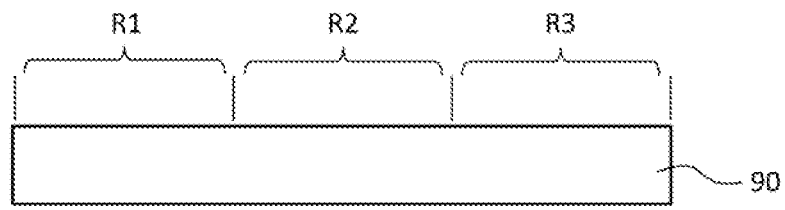
FIG. 12A to FIG. 12C each are a side view for describing regions set for determining a gripping position for a workpiece having a different shape, which is a picking target of the picking system according to Embodiment 1.
Figure 12B:
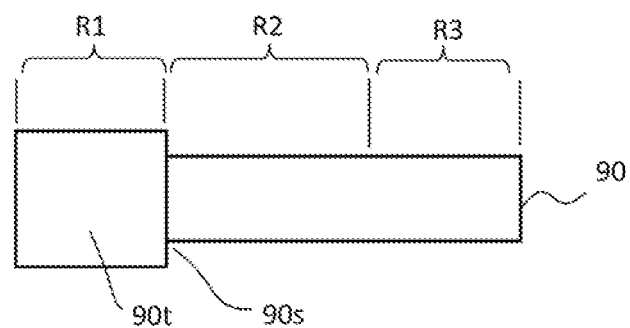
Figure 12C:
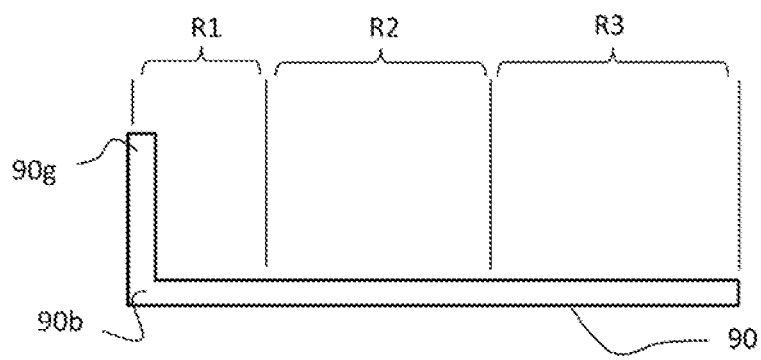

FIG. 12A to FIG. 12C are side views for describing regions set for determining the gripping positions of workpieces having different shapes corresponding to FIG. 3A to FIG. 3C, respectively. Embodiment 1 will now be described in detail with reference to the figures. Note that, in the following figures, the same or corresponding portions are denoted by the same reference numerals, and the description thereof will not be repeated.

The picking system according to the present application is a system for picking a workpiece in a bulk stacked state by a robot in order to incorporate them into a product. Therefore, as shown in FIG. 1, the picking system 1 includes a robot 2 that selects and takes out one workpiece 90 from the workpiece placement apparatus 6 such as a pallet in which a plurality of workpieces 90 are disposed, and the posture changing device 3 that changes posture of a gripped workpiece 90. Further, a workpiece posture calculation unit 4 is provided, which includes an imaging unit 41 capable of acquiring a three-dimensional image of a workpiece 90 in an any desired region, identifies a workpiece 90 individually on the basis of the imaging data of the workpieces 90, and calculates the posture of the identified workpiece 90.

Although only one robot arm 21 is drawn, the robot 2 is a five degree-of-freedom horizontal articulated robot, a six degree-of-freedom vertical articulated robot, or a collaborative robot, and is provided with a plurality of robot arms 21, a plurality of joints, a base, and the like. A flange 21f for mounting a robot hand 22 for gripping a workpiece 90 is provided at the tip of each robot arm 21. Further, a robot control unit 23 is provided to control the operation of each part on the basis of the information indicating the posture of a workpiece 90 from the workpiece posture calculation unit 4.

The robot hand 22 is connected to the flange 21f of the robot arm 21, and is used as a tool for performing work such as picking of a workpiece 90. The position and operation of the robot hand 22 are controlled by the robot control unit 23.

Figure 2A:
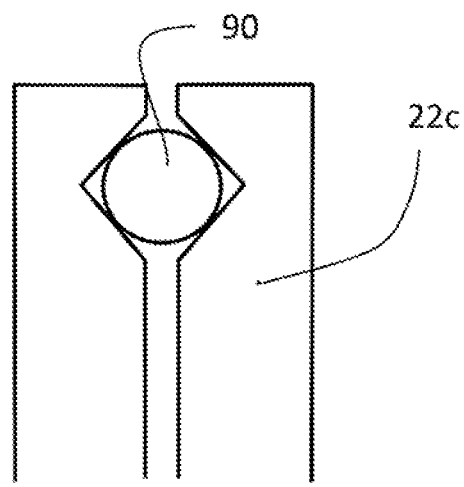
FIG. 2A and FIG. 2B each are a side view for describing a configuration of a gripping claw having a different shape, which is attached to the tip of a robot arm of the picking system according to Embodiment 1.
Figure 2B:
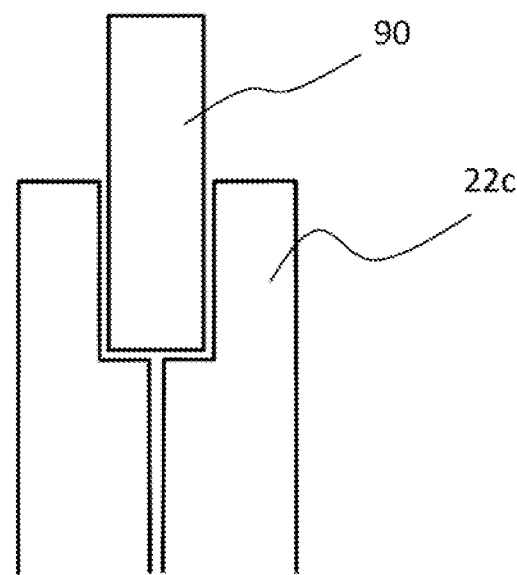

The robot hand 22 grips a workpiece 90 on the basis of a control command from the robot control unit 23. As shown in FIG. 2A and FIG. 2B, a gripping claw 22c corresponding to the shape of a workpiece 90 is detachably attached to the tip of the robot hand 22.

The shape of the gripping claw 22c can be freely designed, such as a shape exclusively adapted to the shape of a workpiece 90 to be taken out from a bulk stacked state, or a shape capable of meeting a plurality of types of workpieces 90. Although FIG. 1 is drawn under the assumption of rectangular parallelepiped workpieces 90, FIG. 2A shows the gripping claw 22c used to grip a workpiece 90 having a circular gripping surface, and FIG. 2B shows the gripping claw 22c used to grip a flat portion of a workpiece 90.

The imaging unit 41 measures a plurality of workpieces 90 disposed in the workpiece placement apparatus 6 three-dimensionally and acquires data (imaging data) relating to the positions and postures of the workpieces 90 in the workpiece placement apparatus 6. The imaging unit 41 is, for example, a three-dimensional vision sensor, and is constituted by a device capable of acquiring a three-dimensional image of a workpiece 90 in any desired region. The workpiece posture calculation unit 4 performs image processing on the data of the three-dimensional image acquired by the imaging unit 41, and transmits information to the robot control unit 23 as workpiece position measurement data. The workpiece posture calculation unit 4 may be disposed in the vicinity of or an inside of the imaging unit 41, or may be disposed inside the robot control unit 23 or inside the housing thereof.

The imaging unit 41 and the workpiece posture calculation unit 4 need to have a function of specifying a gripping position using the three-dimensional model information of a workpiece 90. In other words, a function should be provided therein in which the shape of a workpiece 90 to be picked is input as a three-dimensional model to the workpiece posture calculation unit 4 in advance, and the workpiece that can be taken out from the bulk stacked state is accurately identified and the gripping position can be specified using the image captured by the imaging unit 41.

The workpiece placement apparatus 6 is an apparatus on which a plurality of workpieces 90 are stacked. The stacked states of the workpieces 90 are roughly classified into a state in which the workpieces 90 are aligned inside the work placement apparatus 6 and a state in which the workpieces 90 are stacked in bulk. Note that, in the present specification, the term "stacked in bulk" refers to a state in which a plurality of workpieces 90 are not positioned or a state in which a workpiece 90 is in contact with at least another workpiece 90 or an inner wall 6w of the workpiece placement apparatus 6. The workpiece placement apparatus 6 is, for example, a pallet for loading workpieces or a returnable box.

The feature of the picking system 1 of the present application is to correct the posture of a workpiece 90 using the posture changing device 3, but before the characteristic description, the problem in the picking system for the workpieces stacked in bulk as a target will be described.

In the picking system 1, various shapes are assumed as the workpiece 90 to be picked. For example, a flat bracket, a plate material, or the like is classified as the workpiece 90 having a rectangular parallelepiped shape, a rod-shape, or the like as shown in FIG. 3A. Further, a screw, a bolt with a hexagonal hole, or the like is classified as the workpiece 90 having a stepped portion 90s as shown in FIG. 3B. Further, a sheet metal member having a bent portion, a wire rod subjected to bending, an L-shaped bracket, or the like is classified as the L-shaped workpiece 90 having a bent portion 90b as shown in FIG. 3C.

In the case where such workpieces 90 are in the bulk stacked state, there are various kinds of postures in a workpiece 90 to be picked or in the overlapping states with other workpieces 90. Depending on the posture and position of a workpiece 90, the workpiece 90 to be picked may not be taken out at a desired position and direction due to interference within the robot hand 22 and the inner wall 6w of the workpiece placement apparatus 6, a floor surface 6f, or other workpieces 90.

For example, it is assumed that the rectangular parallelepiped rod-shaped workpiece 90 described with reference to FIG. 3A is desired to be taken out in a posture (intended posture) as shown in FIG. 4A. As shown in FIG. 4B, in the case of an unintended posture in which the longitudinal direction of a workpiece 90 is horizontal and the workpiece is in contact with the floor surface 6f of the workpiece placement apparatus 6, the robot hand 22 is to come into contact with the workpiece placement apparatus 6. As a result, the workpiece 90 cannot be taken out in the intended posture, and the workpiece 90 can be taken out only in the unintended posture as shown in FIG. 4C.

Figure 5A:
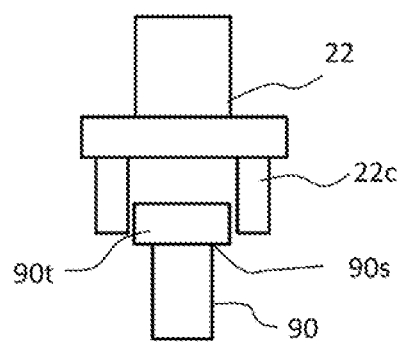
FIG. 5A, FIG. 5B, FIG. 5C, and FIG. 5D are side views for describing an intended gripping posture for a stepped shape workpiece, a state of a workpiece stacked in a first unintended posture and a state of a workpiece gripped in the first unintended posture, and a state of a robot hand for a workpiece stacked in a second unintended posture in the picking system according to Embodiment 1, respectively.
Figures 5B, 5C:
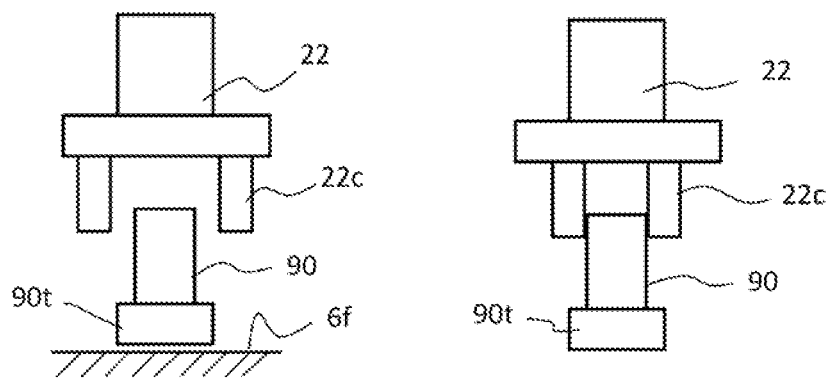
Figure 5D:
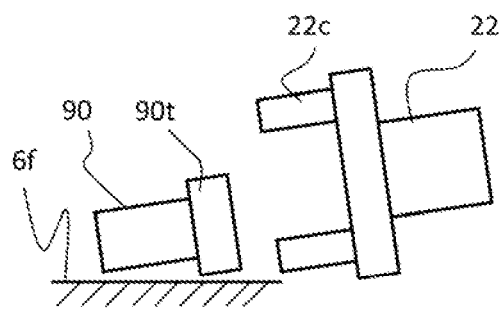

Further, it is assumed that the workpiece 90 having the stepped portion 90s described with reference to FIG. 3B is desired to be taken out by gripping a head 90t in a posture (intended posture) in which the head 90t is directed upward as shown in FIG. 5A. When the posture of the workpiece 90 is the first unintended posture in which the head 90t is directed downward as shown in FIG. 5B, the workpiece 90 can be taken out only in the unintended posture as shown in FIG. 5C. Or, as shown in FIG. 5D, when the workpiece 90 is placed in a lying posture against the floor surface 6f, there is a possibility that the robot hand 22 comes into contact with the floor surface 6f or the inner wall 6w when the workpiece 90 is taken out, and the workpiece 90 cannot be taken out in the intended posture as shown in FIG. 5A.

Further, it is assumed that the L-shaped workpiece 90 having the bent portion 90b described with reference to FIG. 3C is to be taken out by gripping the tip of a short arm 90g in a posture (intended posture) in which the tip of the short arm 90g is directed upward as shown in FIG. 6A. When the posture of the workpiece 90 is the intended posture in which the tip of the short arm 90g is directed upward as shown in FIG. 6B, the workpiece 90 can be gripped at a desired position and taken out. However, when the workpiece is placed in a posture in which the short arm 90g faces the floor surface 6f as shown in FIG. 6C, there is a possibility that the robot hand 22 comes into contact with the floor surface 6f or the inner wall 6w when the workpiece 90 is taken out, and the workpiece 90 cannot be taken out in the intended posture as shown in FIG. 6A.

Even when the workpiece 90 to be picked is in the above-described intended posture, when the workpieces are stacked in bulk as shown in FIG. 1, FIG. 7A, and FIG. 7B, it is more difficult to take out the workpiece 90. Even if a workpiece 90 is in the intended posture in which it can be taken out, depending on the positional relationship of the workpiece with the peripheral workpieces 90, the floor surface 6f, and the inner wall 6w, the robot hand 22 may interfere with other workpieces 90, the floor surface 6f, and the inner wall 6w around the workpieces 90, and in this case, the workpiece 90 cannot be taken out at the desired gripping position and posture.

As described above, in the case where the workpiece 90 to be picked is aligned in a desired posture (intended posture), the workpiece 90 can be taken out at the desired posture by the robot without any particular adjustment, so that the workpiece 90 taken out can be put into a product without changing the posture. On the other hand, it is difficult to take out a workpiece 90 at the desired posture for the workpieces 90 in the bulk stacked state or for a workpiece 90 not in the desired posture, and thus it is often difficult to put the workpiece 90 into a product without changing the posture after taking out the workpiece 90. Therefore, before the workpieces 90 are put into a work area of the robot 2, an operation is required for manually aligning the workpieces 90 on the pallet by an operator, and the cycle time of the product manufacturing increases.

As a method for solving such a problem, for example, there is a method in which one of the workpieces 90 taken out not in the intended posture as shown in FIG. 8A and FIG. 8B is placed on the temporary placing table 60, and after the posture is stabilized, the posture of the robot is changed again, and then the workpiece 90 is taken out. With reference to FIG. 8A to FIG. 8F, the manner in which the posture of the L-shaped workpiece shown in FIG. 3C is changed by the above-described method will be exemplified.

In the case where the workpiece 90 having the shape shown in FIG. 3C is desired to be taken out in the posture shown in FIG. 6A, when the workpiece 90 is placed in the posture shown in FIG. 6C, the robot hand 22 or the gripping claw 22c interferes with the temporary placing table 60. Therefore, the workpiece 90 can be taken out only in the posture as shown in FIG. 8C and FIG. 8D.

Figure 8E:
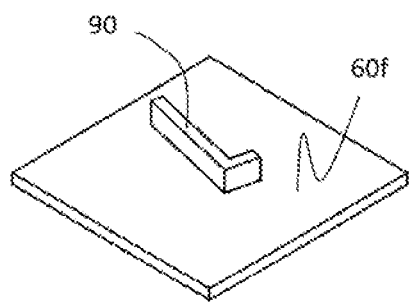

Then, the workpiece 90 taken out in the posture as shown in FIG. 8C and FIG. 8D is temporarily placed on the temporary placing table 60 in the state as shown in FIG. 8A and FIG. 8B. In that state, the posture is changed as shown in FIG. 8E by toppling the workpiece 90 due to its own weight, or by the toppling of the workpiece 90 due to the vibration when the temporary placing table 60 has a function to be vibrated, or by the toppling of the workpiece 90 due to the operation of the robot such as bringing the robot hand 22 into contact with the workpiece 90.

Figure 8F:
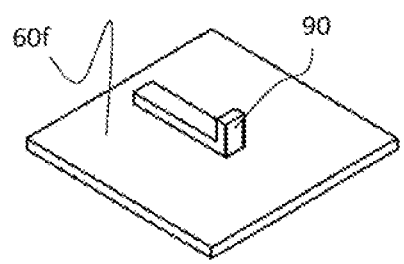

The workpiece 90 whose posture is changed in this way is taken out by the robot again to temporarily place the workpiece on the temporary placing table 60, and by repeating the operation of changing the posture, the posture of the workpiece 90 can be changed into the state as shown in FIG. 8F. The workpiece 90 in the posture shown in FIG. 8F can be taken out in the posture as shown in FIG. 6A, and it can be said that the posture change for the workpiece 90 is successfully done.

However, in the above-described method, the picking and placing operations of the workpiece 90 by the robot are repeated a plurality of times, and there is a problem in that the cycle time required for changing the posture of the workpiece is long. Further, in the case where an operator manually aligns workpieces 90 on the pallet, the posture change is completed in one operation without gripping switching of the workpiece, and therefore, it can be said that the operation is inefficient as compared with the manual operation.

Furthermore, when the workpiece 90 placed on the temporary placement table 60 is toppled owing to the weight of the workpiece 90 or the vibration of the temporary placement table 60, the direction of the toppling is not uniquely determined. Therefore, it is necessary to capture an image of the state of the workpiece 90 by the imaging unit before re-gripping is performed by the robot, calculate the position for taking out the workpiece, and then perform the operation for taking out the workpiece by the robot. That is, since it takes time to calculate the posture of the workpiece 90 and an imaging unit different from that for picking up the workpiece is required, it can be said that this posture changing method is not cost effective. For the above-described reasons, it is considered that the method of changing the posture of the workpiece 90 by temporarily placing the workpiece 90 on the temporary placement table 60 is not an optimal means from the time and financial point of view.

In order to solve such a problem, the picking system 1 of the present application causes the posture changing device 3 instead to hold a workpiece 90 taken out in an unintended posture from the robot 2, and the workpiece 90 is rotated and then gripped again by the robot 2 so that the workpiece 90 can be gripped in the desired posture. As shown in FIG. 1, the posture changing device 3 includes a gripping switching chuck 31, gripping claw 31c attached to the tip of the gripping switching chuck 31, and a rotation unit 32 that rotates the gripping switching chuck 31, and is configured to operate in response to a command from the workpiece posture calculating unit 4. Further, a calculation unit (not shown) is provided to calculate the posture and angle of a workpiece 90 before the posture change and the desired posture on the basis of the information of the workpiece posture calculation unit 4.

The gripping switching chuck 31 receives a workpiece 90 gripped in an unintended posture by the robot hand 22, changes the posture of the received workpiece 90 into that of the desired posture, and transfers the workpiece 90 to the robot hand 22. The rotation unit 32 has a function of changing the direction of the gripped workpiece 90 for the desired posture by the rotation based on the information of the workpiece posture calculation unit 4 when the gripping switching chuck 31 attached to the tip of the rotation unit 32 receives the workpiece 90 from the robot 2.

The rotation unit 32 is, for example, a servo motor, and changes the direction (angle) of a workpiece 90 by controlling the amount of rotation of the motor on the basis of the calculation result of the calculation unit. Since the robot hand 22 picks a workpiece 90 in a bulk stacked state, the robot hand 22 often takes out the workpiece 90 in a posture other than the desired posture. On the other hand, in the picking system 1 of the present application, the direction of a workpiece 90 is changed by changing the angle of the gripping switching chuck 31 that has received the workpiece 90 from the robot hand 22, and the workpiece 90 is transferred to the robot 2. Thus, the workpiece 90 can be picked at the desired posture.

The rotation unit 32 should have a structure including a device capable of controlling the amount of rotation of a workpiece 90 and accurately guiding the rotation in response to a command from the robot control unit 23 or the workpiece posture calculation unit 4, and may be a direct drive motor or the like. Further, the device should include an encoder capable of measuring the amount of rotation by the rotation unit 32.

The operation of the above-described picking system 1 will be described with reference to the flowchart of FIG. 9 and FIG. 11A. Note that, in the following operation, the workpiece posture calculation unit 4 or the robot control unit 23 may function as a control unit that controls the robot 2 and the posture changing device 3 in a coordinated manner. Alternatively, a control unit (not shown) may be provided as a separate system. First, the imaging unit 41 captures images of the workpieces 90 stacked in bulk on the workpiece placement apparatus 6 (step S100). Then, the workpiece posture calculation unit 4 generates workpiece position posture data from the captured images, selects a workpiece 90 to be picked, and determines a gripping position (step S110).

Next, the robot control unit 23 causes the robot hand 22 to approach the workpiece 90 determined by the workpiece posture calculation unit 4, grips the designated portion of the target workpiece 90 with the robot hand 22, and takes out the target workpiece 90 from the workpiece placement apparatus 6 (step S120). As shown in FIG. 10A, the robot 2 moves the workpiece 90 taken out toward the posture changing device 3 (direction Df) (step S130). Then, when the gripping switching chuck 31 closes the gripping claw 31c and grips the workpiece 90, the robot 2 opens the gripping claw 22c of the robot hand 22 and the gripping switching is performed such that the gripped workpiece 90 is transferred to the gripping switching chuck 31 of the posture changing device 3 (step S200) as shown in FIG. 10B.

Here, it is determined whether or not the angle of the workpiece 90 after the gripping switching needs to be changed (step S300). Information output from the workpiece posture calculation unit 4 or the robot control unit 23 is used to determine whether the angle needs to be changed. If the angle needs to be changed ("Yes" in step S300), as shown in FIG. 10C, the rotation unit 32 is rotated in a rotation direction Dr3 to change the angle (step S310), and it is determined whether the angle needs to be changed again (step S300).

If it is not necessary to change the angle, or when the angle reaches an angle that does not need to be changed ("No" in step S300), it is determined whether or not it is necessary to change the gripping position (step S400). The information output from the workpiece posture calculation unit 4 or the robot control unit 23 is also used to determine whether or not the gripping position needs to be changed. If the gripping position needs to be changed ("Yes" in step S400), the robot 2 rotates in its axis inclination Da2 and in a rotational direction Dr22 around its axis, moves the gripping claw 22c to the desired gripping position of the workpiece 90 to change the gripping position (step S410). Then, it is determined whether the gripping position needs to be changed again (step S400).

If it is not necessary to change the gripping position, or when the gripping position reaches a position that does not need to be changed ("No" in step S400), the robot hand 22 grips the workpiece 90. In a case where it is not necessary to change the gripping position of the workpiece 90, the gripping claw 22c is moved so as to be able to grip the position at which the workpiece 90 was originally gripped, in consideration of the amount of rotation by the rotation unit 32, and the workpiece 90 is gripped at the desired position and angle.

Figure 10D:
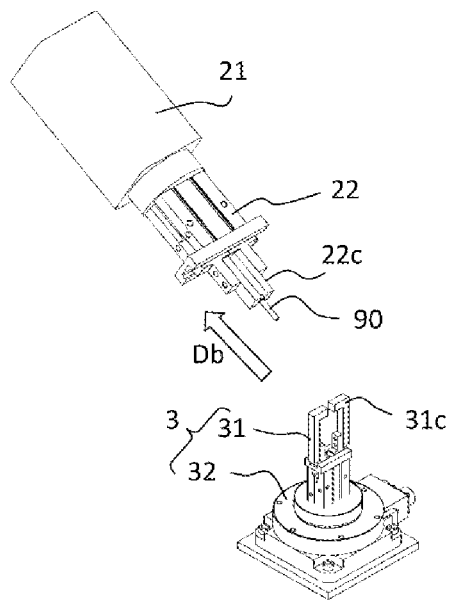
Figure 11A:
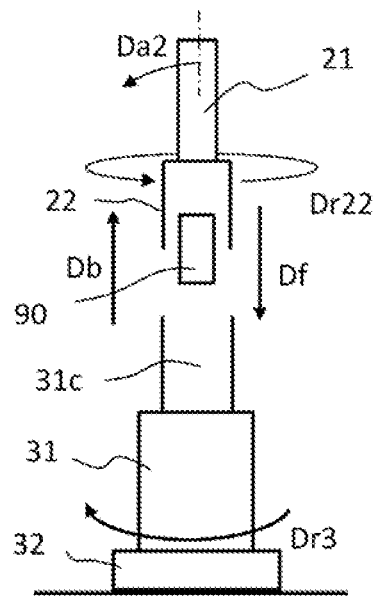
FIG. 11A and FIG. 11B are schematic side views for describing movements of the robot arm and the posture changing device for changing a posture of a workpiece in the picking system according to Embodiment 1 and the picking system according to a third variation, respectively.

In this state, when the gripping switching chuck 31 open the gripping claw 31c and the workpiece 90 is transferred to the robot 2, the robot hand 22 is moved in the direction db away from the posture changing device 3 to complete the taking out of the gripped workpiece 90 from the posture changing device 3 as shown in FIG. 10D. Then, when the robot hand 22 inserts the workpiece 90 gripped at the desired position into a product (step S510), picking of the target workpiece 90 is completed, and the operation from step S100 is repeated for the next target.

In the flowchart of FIG. 9, an example in which the gripping switching to the posture changing device 3 is also performed on the workpiece 90 that can be gripped at the desired position has been described, but this is not a limitation. For example, the determination of the angle and gripping position of the workpiece 90 may be performed before step S130, and when the angle and gripping position do not need to be changed, the process may proceed from step S120 directly to step S510 without the gripping switching of the workpiece.

Next, a gripping position changing method of a workpiece 90 by the posture changing device 3 will be described with reference to FIG. 12A to FIG. 12C. For the gripping position to be changed, a workpiece 90 is divided into three regions of a region R1, a region R2, and a region R3, and the picking system 1 determines a region at which the workpiece 90 is gripped. In workpieces 90, each of desired gripping positions is assumed to be the region R1.

In the picking system 1 of the present application, when a workpiece 90 is to be gripped and taken out at the position of the region R1, for the axisymmetric workpieces 90 shown in FIG. 3A and FIG. 3B, it is not necessary to change the gripping position of the workpiece 90 by the posture changing device 3. Therefore, after causing the gripping switching chuck 31 to hold either of the remaining two regions and the angle of the workpiece is changed, the workpiece is gripped again at the original position so that the angle of the workpiece 90 can be changed.

On the other hand, when the robot 2 picks up the workpiece 90 by gripping the position of either the region R2 or the region R3, the gripping switching chuck 31 is caused to grip the remaining one region other than the region R1. Then, after changing the angle of the workpiece 90, the robot grips the region R1, and thus the gripping position of the workpiece 90 can be changed. For example, when the portion in the region R2 of the workpiece 90 is gripped and taken out from the workpiece placement apparatus 6, the portion in the region R3 is gripped by the gripping switching chuck 31, and then the portion in the region R1 is gripped by the robot, whereby the workpiece 90 can be picked at the desired position and angle.

Further, even when the workpiece 90 is gripped at the position of the region R1 and taken out, if the workpiece 90 having directionality, such as the L-shape shown in FIG. 3C, is gripped in the condition shown in FIG. 6C, it is necessary to change the gripping direction using the posture changing device 3. Also in this case, it is impossible to do anything while the workpiece is in contact with the surface such as the floor surface 6f. However, since the workpiece 90 is gripped with it being floated from the surface by the gripping switching chuck 31, the robot hand 22 can approach the workpiece 90 from any angle. Therefore, for example, if the workpiece 90 is transferred to the posture changing device 3 by adjusting the inclination Da2 such that the axis of the robot hand 22 is horizontal, and the workpiece 90 is received in a state where the rotation unit 32 is rotated by 180 degrees, it is possible to pick the workpiece 90 at the desired posture.

That is, among workpieces 90 in the workpiece placement apparatus 6, only the workpieces 90 in the desired posture and in a state of not interfering with surrounding objects has been the picking targets so far. In contrast, in the picking system 1 of the present application, by gripping and rotating a workpiece 90 gripped with the posture being ununiform by the posture changing device 3, it is possible to reliably correct the posture by controlling the direction and the angle. Therefore, the target range is widened. That is, since the gripping switching is performed after the direction and the amount are clearly corrected by the rotation, the range of workpieces 90 to be picked can be widen and a workpiece 90 is quickly selected and reliably corrected, thereby improving the work efficiency.

First Variation

Figure 13:
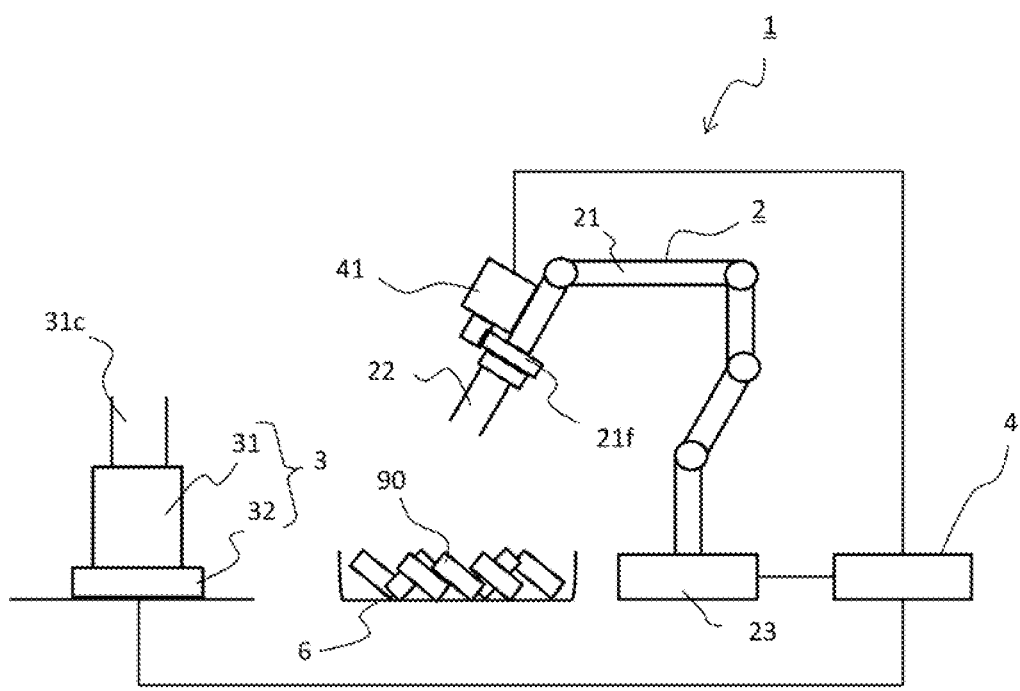
FIG. 13 is a schematic diagram for describing a configuration of a picking system according to a first variation of Embodiment 1.
Figure 14:
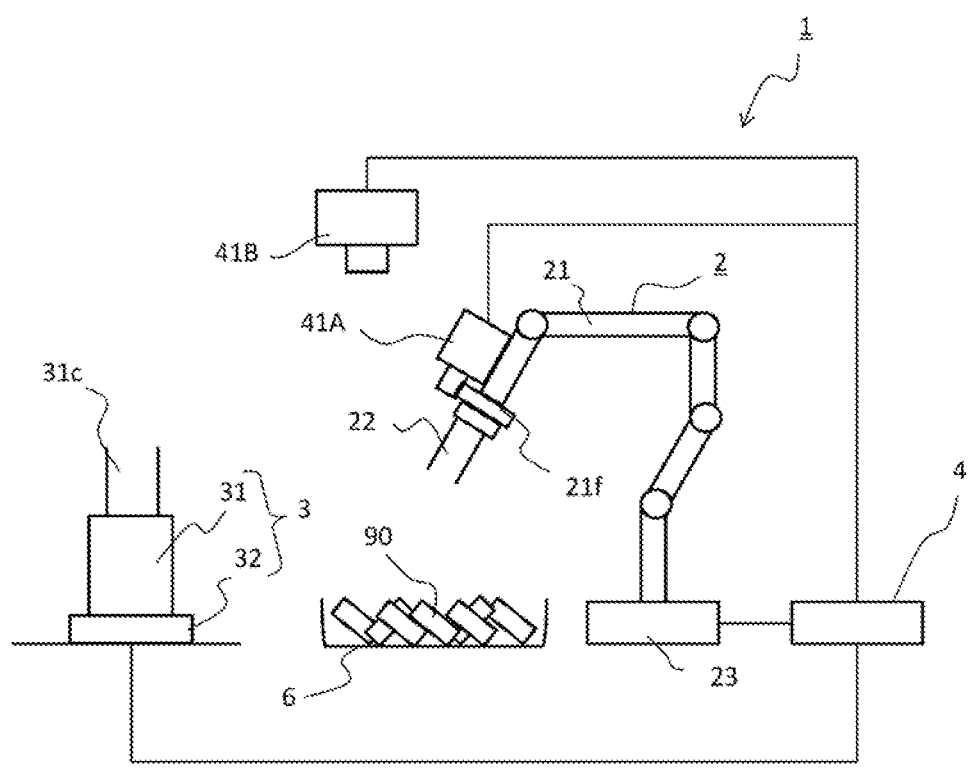
FIG. 14 is a schematic diagram for describing a configuration of a picking system according to a second variation of Embodiment 1.

In a first variation and a second variation to be described later, an example in which the attachment of the imaging unit is different from the example described with reference to FIG. 1 will be described. FIG. 13 is a schematic diagram corresponding to FIG. 1 for describing a configuration of a picking system according to the first variation, and FIG. 14 is a schematic diagram corresponding to FIG. 1 for describing a configuration of a picking system according to the second variation. Note that the configuration other than the imaging unit and the operation other than the operation related to the imaging unit are the same as those described with reference to FIG. 2 to FIG. 12C, and the description of the same parts will be omitted.

As shown in FIG. 13, in the picking system 1 according to the first variation of Embodiment 1, the imaging unit 41 is mounted on the robot arm 21 or the robot hand 22 of the robot 2. In this case, the robot control unit 23 instructs an imaging position of a workpiece 90 above the workpiece placement device 6 within the workpiece placement apparatus 6 in advance, the robot 2 is moved, and a three-dimensional image of the workpiece 90 is acquired by the imaging unit 41 attached to the tip of the robot. The captured three-dimensional image is processed by the workpiece posture calculation unit 4, and the workpiece position measurement data is generated and transmitted to the robot control unit 23.

Since the imaging unit 41 moves in accordance with the movement of the robot 2, calculation for conversion in the coordinates or the like indicating the position of the workpiece 90 is required. However, since the workpiece 90 can be imaged at the closest position depending on the approach of the robot hand 22 to the workpiece 90, the positional relationship with the robot hand 22 can be more accurately grasped.

Second Variation

As shown in FIG. 14, the picking system 1 according to the second variation example of Embodiment 1 is configured such that a plurality of imaging units 41 such as an imaging unit 41A and an imaging unit 41B are provided, and the workpiece placement apparatus 6 can be imaged from multiple directions. The imaging unit 41A is attached to the robot hand 22 as in the first variation, and the imaging unit 41B is fixedly installed in the space above the workpiece placement device 6 as described with reference to FIG. 1.

The workpiece posture calculation unit 4 performs image processing on each of the images captured by the imaging unit 41A and the imaging unit 41B, and calculates three-dimensional workpiece position measurement data. The calculated workpiece position measurement data is transmitted to the robot control unit 23 to operate the robot 2. Both of these imaging units 41 can be installed above the workpiece placement apparatus 6, or one thereof can be installed above the workpiece placement apparatus 6 and the other thereof can be installed at the tip of the robot arm 21, etc., in accordance with workpiece detection conditions.

Note that two two-dimensional vision sensors may be installed to acquire two-dimensional images of any desired region of a workpiece 90 from two directions. However, it is necessary to input the shape model data of the workpiece 90 to be picked into the workpiece posture calculation unit 4 in advance and use a two-dimensional vision sensor having a function of calculating the shape of the workpiece 90. In addition, any device may be used as long as the device has a function of accurately identifying a workpiece 90 that can be taken out from the bulk stacked state and specifying the gripping position thereof from the image captured by the imaging unit 41 by using the calculated shape model of the workpiece 90.

Third Variation

Figure 15:
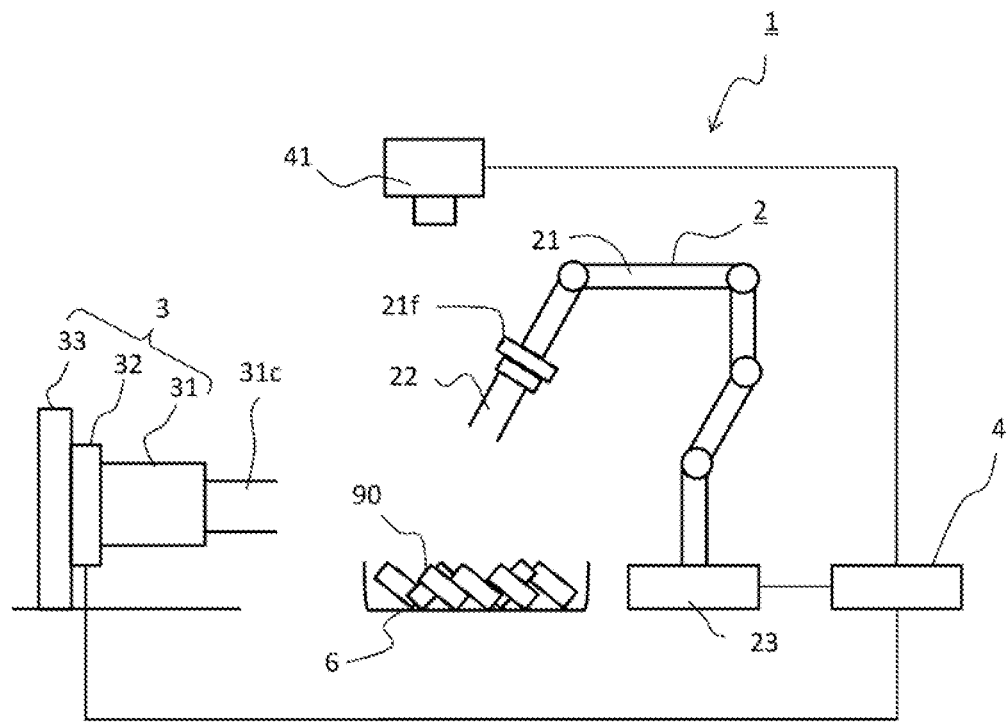
FIG. 15 is a schematic diagram for describing a configuration of a picking system according to the third variation of Embodiment 1.

In the third variation, an example in which the direction of a rotation axis is different from that in the example described with reference to FIG. 1 for the posture changing device will be described. FIG. 15 is a schematic diagram corresponding to FIG. 1 for describing a configuration of a picking system according to the third variation. Note that the configuration and operation of the posture changing device other than the direction of the rotation axis are the same as those described with reference to FIG. 2 to FIG. 12C or FIG. 13 and FIG. 14, and the description of the same parts will be omitted.

Figure 11B:
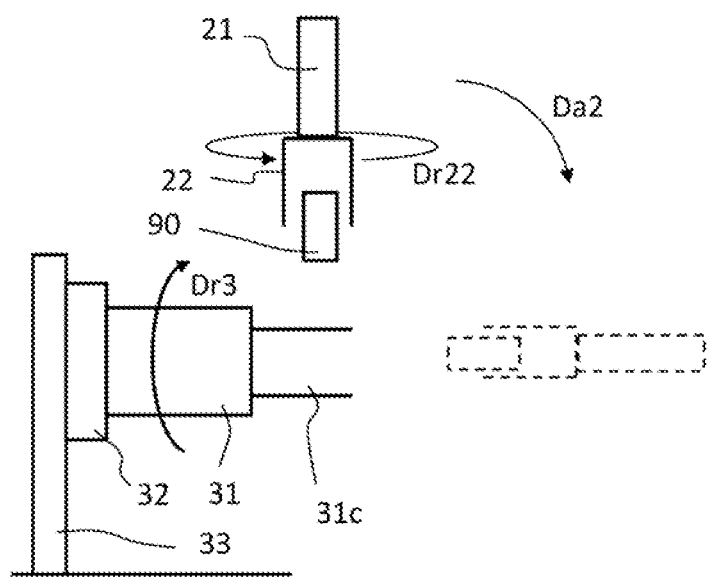

In the picking system 1 according to the third variation of Embodiment 1, as shown in FIG. 15, the rotation unit 32 of the posture changing device 3 is attached to a bracket 33, and is installed such that the rotation axis is parallel to the floor surface. In this case, the motion of the posture changing device 3, the robot arm 21, and the robot hand 22 is shown in FIG. 11B.

The rotation axis of the rotation unit 32 does not need to be fixed to one of the vertical direction shown in FIG. 1 and the horizontal direction shown in FIG. 15, and for example, the inclination may be changed depending on the type and posture of a workpiece 90, as appropriate. Also in this case, control is performed in association with the control of the rotation direction Dr3 by using information output from the workpiece posture calculation unit 4 or the robot control unit 23. Further, the posture changing device 3 may be constituted by another arm of the robot 2.

Figure 16:
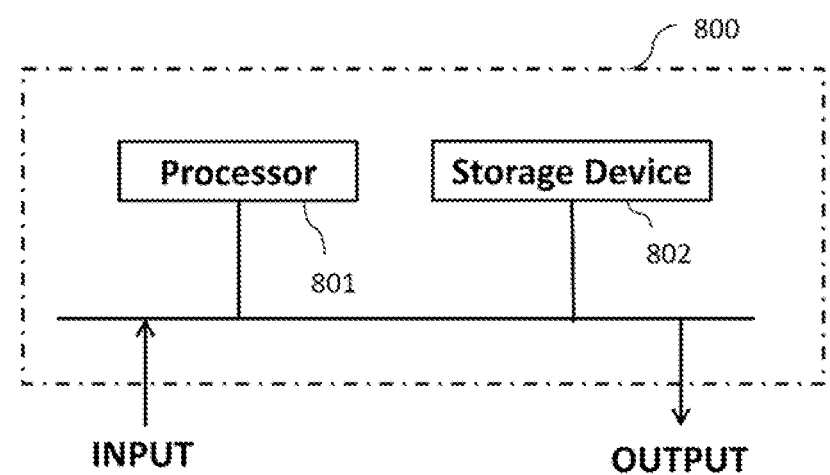
FIG. 16 is a block diagram showing a configuration example of a portion for executing arithmetic processing of the picking system according to Embodiment 1.

Note that, in the picking system 1 of the present application, in a case where an execution part of arithmetic processing or a control unit is configured by software using a microcomputer, hardware may be configured with a single microcomputer 800 including a processor 801 and a storage device 802 as shown in FIG. 16. Although not shown, the storage device 802 includes a volatile storage device such as a random access memory and a nonvolatile auxiliary storage device such as a flash memory. Further, an auxiliary storage device such as a hard disk may be provided instead of the flash memory. The processor 801 executes a program input from the storage device 802, in which case the program is input from the auxiliary storage device to the processor 801 via the volatile storage device. In addition, the processor 801 may output data such as a calculation result to the volatile storage device of the storage device 802, or may store data in the auxiliary storage device via the volatile storage device.

Embodiment 2

In Embodiment 1, an example in which the operation is controlled on the basis of the data indicating the posture of a workpiece on the workpiece placement apparatus has been described. In Embodiment 2, an example in which the operation is controlled by also adding data indicating the posture of a workpiece on the posture changing device will be described in contrast to Embodiment 1.

Figure 17:
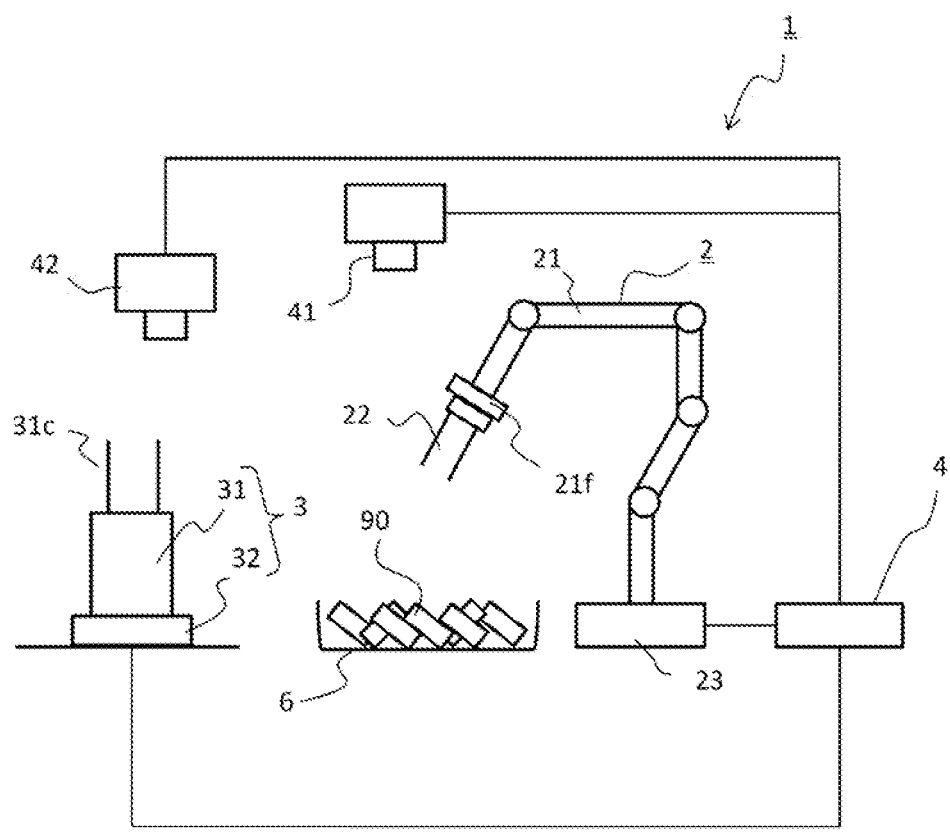
FIG. 17 is a schematic diagram for describing a configuration of a picking system according to Embodiment 2.
Figure 18:
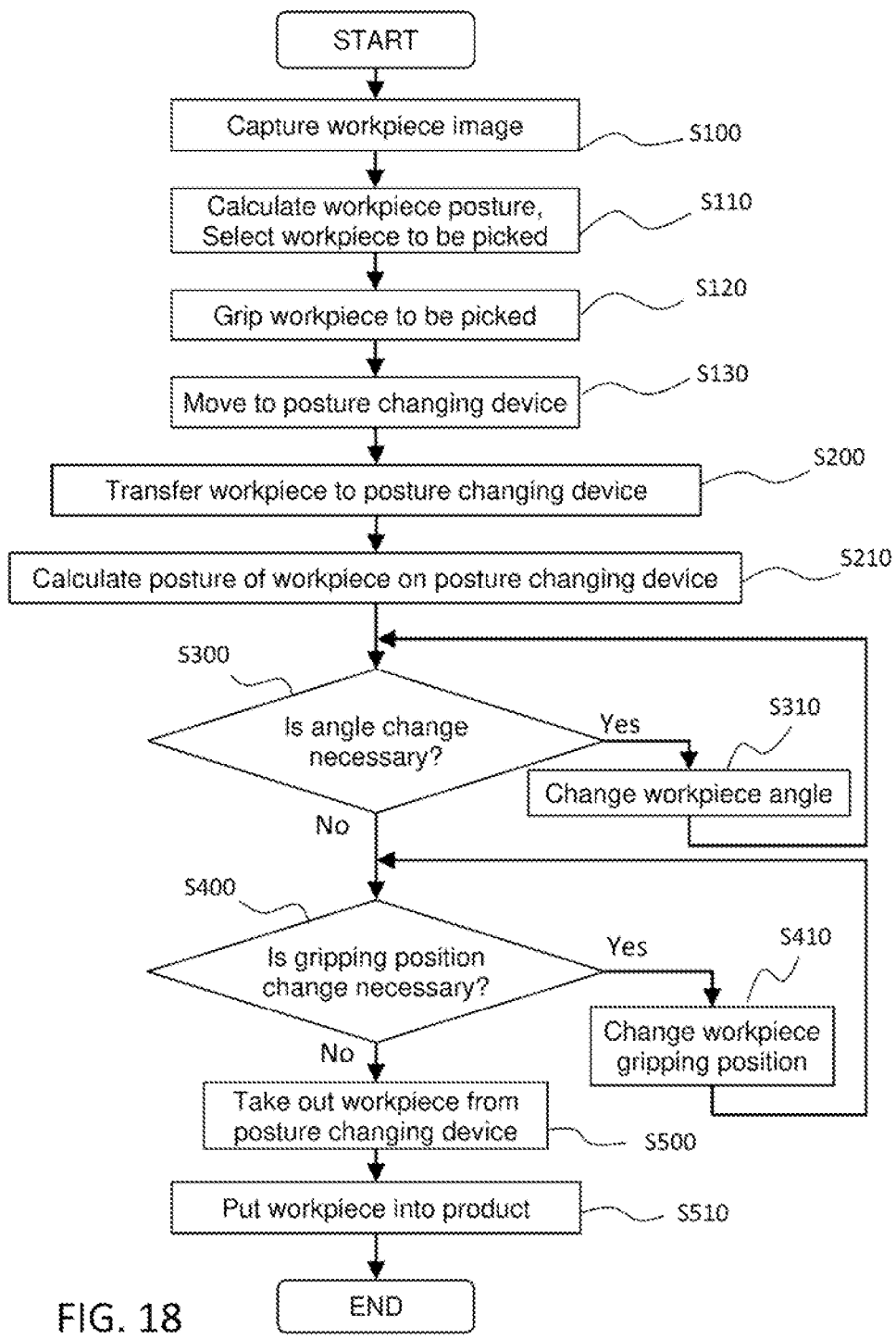
FIG. 18 is a flow chart for describing an operation of the picking system according to Embodiment 2.

FIGS. 17 and 18 are diagrams for describing a configuration and an operation of a picking system according to Embodiment 2, FIG. 17 is a schematic diagram for describing an overall configuration of the picking system, and FIG. 18 is a flowchart for describing the operation of the picking system. Note that the configuration and the operation other than the configuration and the operation related to the data indicating the posture of the workpiece on the posture changing device are the same as those described in Embodiment 1, and the description of the same parts will be omitted, and the figures other than FIG. 1 and FIG. 9 used in Embodiment 1 will be referred to.

In the picking system 1 according to Embodiment 2, as shown in FIG. 17, the second imaging unit 42 disposed above or on the side of the gripping switching chuck 31 is provided so that data indicating the posture and direction of the workpiece 90 gripped by the gripping switching chuck can be acquired. As with the imaging unit 41, the second imaging unit 42 needs to be configured by a device capable of acquiring a three-dimensional image of a workpiece 90, such as a three-dimensional vision sensor, and it may have a structure including a plurality of imaging units.

A three-dimensional image of a workpiece 90 is acquired by capturing the image after the posture is changed by the second imaging unit 42, and image processing is performed by the workpiece posture calculation unit 4 to generate the workpiece position measurement data. The position of the robot 2 is corrected on the basis of the data, and the robot hand 22 takes out the workpiece from the gripping switching chuck 31. Accordingly, it is possible to pick the workpiece more accurately than in the case of Embodiment 1.

The operation of the picking system 1 according to Embodiment 2 will be described with reference to the flowchart of FIG. 18. The steps from the step of imaging the workpieces 90 stacked in bulk on the workpiece placement apparatus 6 (step S100) to the step of transferring the gripped workpiece 90 to the gripping switching chuck 31 (step S200) are the same as those in Embodiment 1, and thus the description thereof will be omitted.

When the workpiece 90 is transferred from the robot 2 to the gripping switching chuck 31, a three-dimensional image of the workpiece 90 gripped by the gripping switching chuck 31 is captured by the second imaging unit 42, and image processing is performed on the image by the workpiece posture calculation unit 4. The position measurement data indicating the posture of the workpiece 90 is calculated from the image processing result of the workpiece posture calculation unit 4 (step S210).

Using the data indicating the posture obtained in step S210 in addition to the information output from the workpiece posture calculation unit 4 or the robot control unit 23, the necessity of the angle change and the gripping position change of the transferred workpiece 90 is determined, and the change operation is performed (steps S300 to S410). The subsequent steps (steps from step S500) are the same as those in Embodiment 1.

Accordingly, since the position of the workpiece 90 is detected by the data obtained from the second imaging unit 42, it is possible to more accurately pick the workpiece 90 than in Embodiment 1, as compared to a case where the posture of the workpiece 90 is changed on the basis of the information regarding the rotation amount of the rotation unit 32. The method of changing the gripping position of a workpiece 90 is the same as that in Embodiment 1.

The second imaging unit 42 may be installed so as to be able to generate the workpiece position measurement data by capturing the image of the gripping switching chuck 31 not only from the above of the gripping switching chuck 31 but also from the side of the gripping switching chuck 31. Further, as in the third variation of Embodiment 1, the bracket 33 may be installed in the posture changing device 3.

Embodiment 3

In Embodiment 1 and Embodiment 2 described above, the system and the method are described in which, for a workpiece taken out from the bulk stacked state, the posture of the workpiece having a posture different from the intended posture is changed by using the posture changing device including the gripping switching chuck and the rotation unit. In Embodiment 3, an example will be described in which the posture changing device shown in Embodiment 1 and Embodiment 2 is configured by a posture changing robot, and the posture changing operation of a workpiece is controlled thereby.

Figure 19:
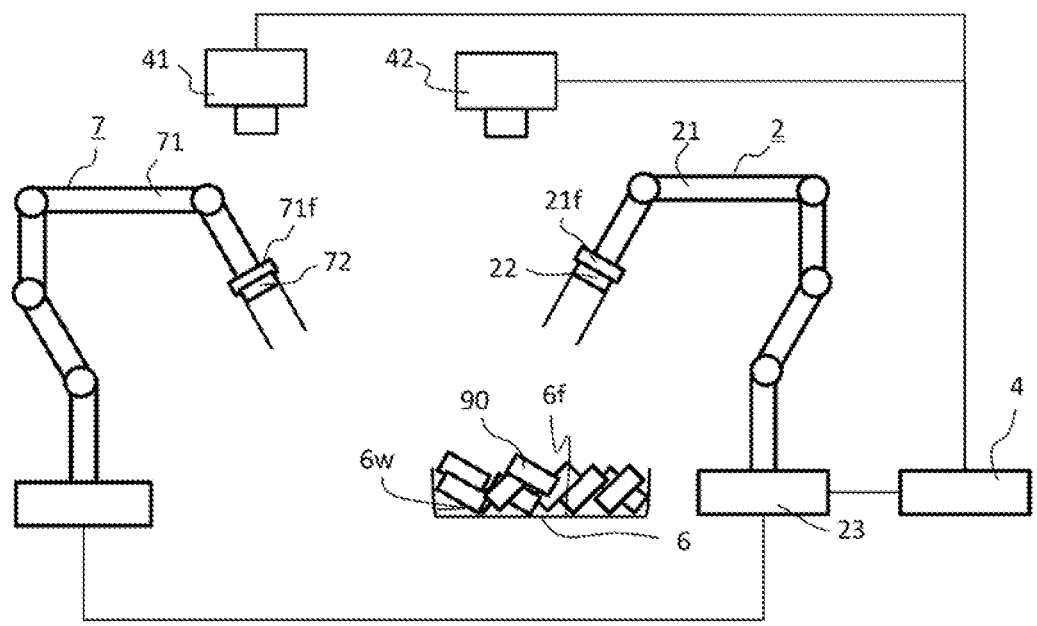
FIG. 19 is a schematic diagram for describing a configuration of a picking system according to Embodiment 3.
Figure 20:
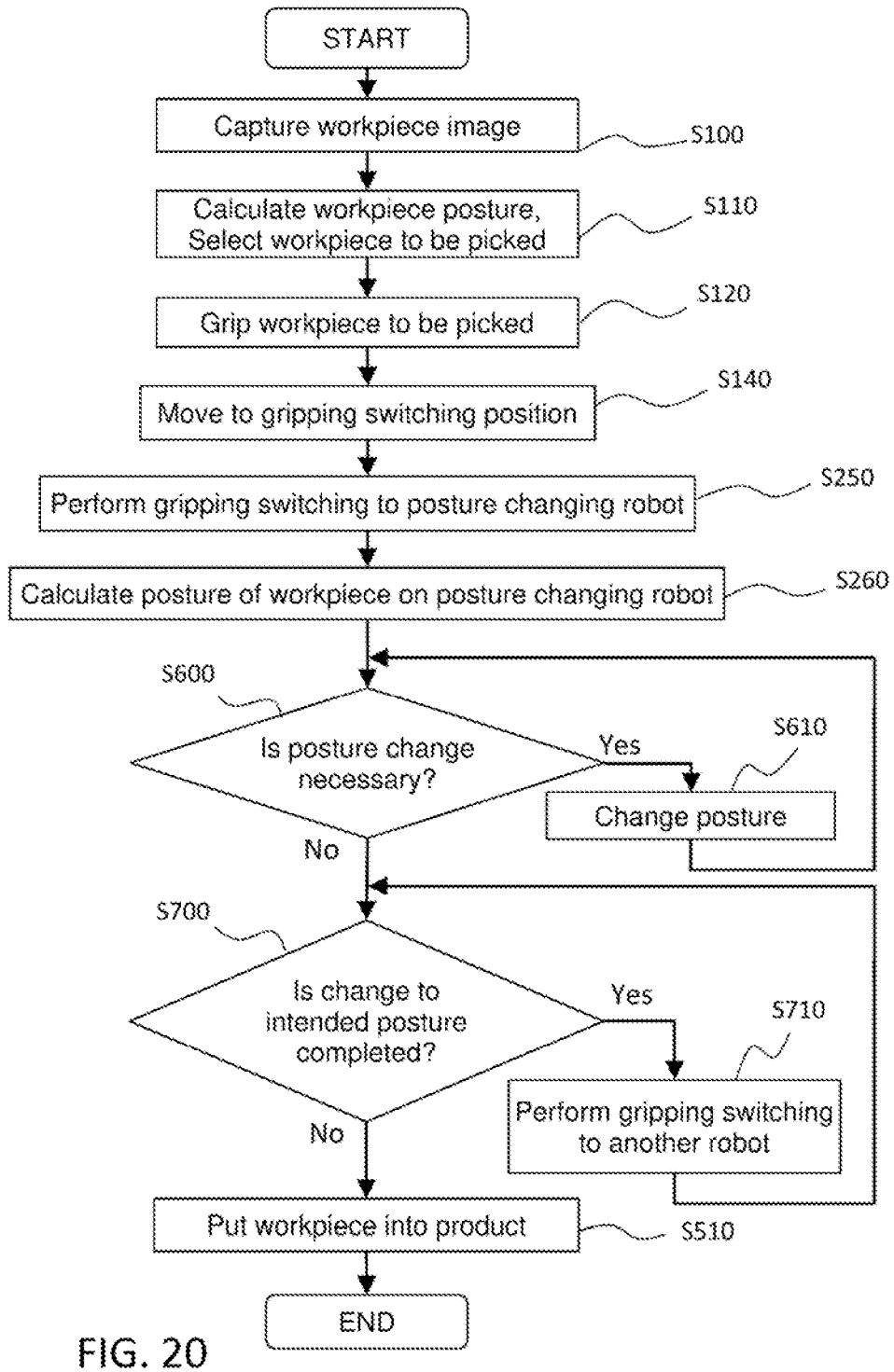
FIG. 20 is a flowchart for describing an operation of the picking system according to Embodiment 3.

FIG. 19 and FIG. 20 are diagrams for describing a configuration and an operation of a picking system according to Embodiment 3, FIG. 19 is a schematic diagram for describing an overall configuration of the picking system, and FIG. 20 is a flowchart for describing the operation of the picking system. Note that the configuration and operation of the devices other than those related to the posture change of a workpiece are the same as those described in Embodiment 1 and Embodiment 2, and the description of the same parts will be omitted, and the figures other than FIG. 1 and FIG. 9 used in Embodiment 1 and the figures other than FIG. 17 and FIG. 18 used in Embodiment 2 will be referred to.

As shown in FIG. 19, the picking system 1 according to Embodiment 3 includes the posture changing robot 7 instead of the posture changing device 3 described in Embodiment 1 and Embodiment 2. Although only one robot arm 71 is drawn, the posture changing robot 7 is a five degree-of-freedom horizontal articulated robot, a six degree-of-freedom vertical articulated robot, or a collaborative robot, similar to the robot 2, and is provided with a plurality of robot arms 71, a plurality of joints, a base, and the like.

A flange 71f for attaching the robot hand 72 that grips a workpiece 90 is provided at the tip of the robot arm 71. The posture changing robot 7 is connected to the robot control unit 23 of the robot 2. Then, on the basis of the information indicating the posture of the workpiece 90 from the workpiece posture calculation unit 4, the position and posture of the robot hand 72 of the posture changing robot 7 are controlled by a command from the robot control unit 23.

Note that the robot control unit for the posture changing robot 7 may be configured to be an independent robot control unit and to be controlled separately from the robot 2. However, the independent robot control unit needs to be connected to the workpiece posture calculation unit 4.

The robot hand 72 is connected to the flange 71f of the robot arm 71, and is used as a tool for receiving the workpiece 90 picked by the robot hand 22 of the robot 2, changing the posture of the received workpiece 90, and then transferring the workpiece 90 to the robot hand 22 again. The robot hand 72 grips the workpiece 90 transferred from the robot 2 on the basis of a command from the robot control unit 23. A gripping claw depending on the shape of a workpiece 90, such as the gripping claw 22c shown in FIG. 2A and FIG. 2B, is detachably attached to the tip of the robot hand 72.

In addition, the second imaging unit 42 that acquires imaging data for calculating the posture of the workpiece 90 after a gripping switching operation is performed is provided above the posture changing robot 7, and data indicating the posture and the angle of the workpiece 90 gripped by the posture changing robot 7 can be acquired. Accordingly, after the gripping switching operation, it is possible to determine whether or not it is necessary to return the workpiece 90 to the robot 2 and perform the gripping switching operation again, and it is also possible to improve the accuracy of the posture change of the workpiece 90 by the gripping switching operation. The second imaging unit 42 needs to be configured by a device capable of acquiring a three-dimensional image of a workpiece 90, such as a three-dimensional vision sensor, and it may have a structure including a plurality of imaging units.

On the premise of the above-described configuration, an operation of the picking system 1 according to Embodiment 3 will be described with reference to a flowchart of FIG. 20. Note that the steps from the step of imaging the workpieces 90 stacked in bulk on the workpiece placement apparatus 6 (step S100) to the step of gripping the target workpiece (step S120) are the same as those of Embodiment 1, and thus description thereof will be omitted.

The robot 2 moves the workpiece 90, which has been gripped and taken out (step S120), to a position (gripping switching position) where the workpiece 90 is to be transferred to the posture changing robot 7 (step S140). The gripping switching position is not uniquely determined and is a position at which the workpiece 90 does not interfere with surrounding objects and the gripping switching operation is appropriately performed depending on the shape and posture of the workpiece 90 taken out in step S120.

Then, the gripping claw of the robot hand 72 are opened, and the gripping switching of the gripped workpiece 90 to the robot hand 72 of the posture changing robot 7 is performed in the same manner as described with reference to FIG. 10B (step S250).

When the workpiece 90 is transferred from the robot 2 to the posture changing robot 7, a three-dimensional image of the workpiece 90 gripped by the robot hand 72 attached to the posture changing robot 7 is captured by the second imaging unit 42, and image processing is performed on the image by the workpiece posture calculation unit 4. From the image processing result of the workpiece posture calculation unit 4, the position measurement data indicating the posture of the workpiece 90 on which the gripping switching to the posture changing robot 7 is performed is calculated (step S260).

It is determined whether or not the posture of the transferred workpiece 90 needs to be changed by the posture changing robot 7 using the information indicating the posture obtained in step S260 (step S600) in addition to the information output from the workpiece posture calculation unit 4 or the robot control unit 23. When the posture change by the posture changing robot 7 is necessary ("Yes" in step S600), and the robot arm 71 is operated by a control command of the robot control unit 23 to change the posture of the workpiece 90, together with the robot hand 72 (step S610). Then, it is determined again whether or not the posture of the workpiece 90 needs to be changed (step S600).

When the posture change is not necessary, or when posture changed by the posture changing robot 7 described above reaches the posture in which no change is necessary ("No" in step S600), the process proceeds to the next determination step (step S700). In step S700, it is determined from the imaging result of the second imaging unit 42 and the control command by the robot control unit 23 whether or not the posture of the workpiece has been changed to the posture (intended posture) in which the workpiece can be put into a product.

When it is determined that the workpiece 90 is not in the posture (intended posture) in which the workpiece 90 can be put into a product ("No" in step S700), the gripping switching of the workpiece 90 to another robot (the robot 2 in the flow being currently described) is performed (step S710). Then, after the necessity of the posture change is determined in step S600, the posture changing operation of the workpiece 90 is performed again if necessary.

In this way, the steps from step S600 to step S710 are repeated, the workpiece 90 is transferred between the robot 2 and the posture changing robot 7, so that the workpiece 90 is changed to the desired posture. Since the operation (step S510) after the posture change of the workpiece 90 is completed ("Yes" in step S700) is the same as that in Embodiment 1, the description thereof will be omitted.

As described above, in the picking system 1 according to Embodiment 3, by transferring the workpiece 90 between the robot 2 and the posture changing robot 7 a plurality of times, it is possible to more accurately perform the gripping switching operation of the workpiece. Further, by performing the gripping switching operation by the posture changing robot 7, it is possible to freely set the gripping switching position of the workpiece 90 within the operation range.

In the posture changing device 3 according to Embodiment 1 and Embodiment 2, the gripping switching chuck 31 is fixed. Therefore, when the shape or size of a workpiece 90 is significantly changed, there is a possibility that the workpiece 90 interferes with surrounding objects, and it may be difficult to introduce the system to a production site where various types of workpieces 90 are used. In contrast, the picking system 1 according to Embodiment 3 can solve the above-described problem in the case where the shape or size of the workpiece 90 is changed.

Furthermore, in the picking system 1 according to Embodiment 3, any of the robot 2 and the posture changing robot 7 can input a workpiece into a product (step S510). That is, in the flowchart of FIG. 20, it is a case where "Yes" has never determined in step S600 and "No" has never determined in step S700 from the start, and in this case, the workpiece can be put into a product by the posture changing robot 7 (step S510).

In contrast, in the picking system 1 according to Embodiment 1 and Embodiment 2, the posture changing device 3 is fixed at one position within the picking system 1, and the inputting operation of the workpiece into a product in the step S510 cannot be performed. In this respect, in Embodiment 3, there is a possibility that the number of times of the gripping switching of a workpiece 90 can be reduced, and it can be said that there is an effect of reducing the cycle time required for the picking.

In the flowchart of FIG. 20, an example is described in which the gripping switching to the posture changing robot 7 is performed for the workpiece 90 gripped at a desired position, but this is not a limitation. For example, the determination of the angle and posture of a workpiece 90 may be performed before step S140, and when the angle and the posture do not need to be changed, the process may proceed from step S120 directly to step S510.

Note that, although exemplary embodiments are described in the present application, various features, aspects, and functions described in the embodiments are not limited to the application in a particular embodiment and can be applicable alone or in their various combinations to the embodiments. Accordingly, countless variations that are not illustrated are envisaged within the scope of the art disclosed herein. For example, the cases where at least one component is modified, added or omitted are included.

For example, in the above-described control, the order of the steps can be changed within a range in which the function and the operation are not changed, as appropriate. In addition, the above-described control mechanisms can be combined as appropriate.

As described above, the picking system 1 according to the present application is provided with the workpiece posture calculation unit 4 that includes the imaging unit 41 for capturing images of workpieces 90 stacked in bulk, calculates a posture of each workpiece 90 from imaging data acquired from the imaging unit 41, selects a workpiece 90 to be picked, and determines a gripping position and an angle, the robot 2 that grips and takes out the selected workpiece 90 on a basis of the determination by the workpiece posture calculation unit 4, the posture changing device 3 (or the posture changing robot 7) that includes the chuck (the gripping switching chuck 31 or the robot hand 72) and the rotation unit 32 (or the robot arm 71) for rotating the chuck (the gripping switching chuck 31 or the robot hand 72) and changes a posture of a member grasped by the chuck (the gripping switching chuck 31 or the robot hand 72), and the control unit (for example, the robot control unit 23, the work posture calculation unit 4, the rotation unit 32, or the microcomputer 800) that causes, when the gripping position and the angle that are determined deviate from a gripping position and an angle that are set (for the picking), the posture changing device 3 (or the posture changing robot 7) instead to hold the workpiece 90 gripped by the robot 2 and to rotate the workpiece 90, and then causes the robot 2 to grip the workpiece again so as to match the gripping position and the angle that are set. Therefore, a workpiece 90 supplied in a non-uniform posture is changed in a desired angle and held back again, so that the workpiece 90 can be reliably gripped in a proper posture and put into a product.

In particular, when the rotation axis of the rotation unit 32 is horizontal, the vertical direction of a workpiece 90 can be easily corrected.

Alternatively, if the inclination of the rotation axis of the rotation unit 32 is variable, any posture can be easily corrected. In addition, in the case where a workpiece 90 to be taken out is a long object and the rotation axis is horizontal, the gripping switching operation cannot be performed owing to the interference with the floor surface 6f or the like, but if the inclination of the rotation axis is variable, the posture can be changed and corrected.

When the workpiece posture calculation unit 4 is configured to include the second imaging unit 42 that captures an image of a workpiece gripped by the posture changing device 3 and to recalculate the posture of the rotated workpiece 90 on the basis of the imaging data acquired from the second imaging unit 42, the posture of the workpiece 90 can be corrected more accurately.

When the posture changing device described above is configured to be the posture changing robot 7 that includes the robot hand 72 connected to the robot arm 71 and is capable of freely controlling the position and angle as the chuck, receives the workpiece 90 taken out by the robot 2, and changes the posture of the received workpiece, the posture of the workpiece 90 can be corrected more accurately, the number of times of the gripping switching of the workpiece 90, and the operation time required for the gripping switching operation can be reduced in some cases.

DESCRIPTION OF REFERENCE NUMERALS AND SIGNS

1: picking system, 2: robot, 21: robot arm, 22: robot hand, 22c: gripping claw, 23: robot control unit (control unit), 3: posture changing device, 31: gripping switching chuck, 31c: gripping claw, 32: rotation unit (control unit), 33: bracket, 4: workpiece posture calculation unit (control unit), 41: imaging unit, 42: second imaging unit, 6: workpiece placement apparatus, 7: posture changing robot (posture changing device), 71: robot arm (rotation unit), 72: robot hand (chuck), 90: workpiece

The invention claimed is:

1. A picking system comprising:
a workpiece posture calculator that includes an imager for capturing images of workpieces stacked in bulk, calculates a posture of each workpiece of the workpieces stacked in bulk from imaging data acquired from the imager, selects a workpiece of the workpieces stacked in bulk to be picked, sets a first region, a second region, and a third region for the workpiece, the first region, the second region, and the third region being different regions, and determines a gripping position and an angle in the first region;
a robot that grips the second region of the selected workpiece and takes out the selected workpiece on a basis of the setting by the workpiece posture calculator;
a posture changing device that includes a chuck and a rotor for rotating the chuck and changes a posture of a member grasped by the chuck; and
a controller that causes the posture changing device instead to hold the workpiece gripped by the robot such that the chuck grasps the third region of the workpiece gripped by the robot and to rotate the workpiece grasped by the chuck, and then causes the robot to grip the first region so as to match the gripping position and the angle that are determined.

2. The picking system according to claim 1, wherein three-dimensional model information related to a shape of the workpiece is input to the workpiece posture calculator in advance.

3. The picking system according to claim 1, wherein a rotation axis of the rotor is horizontal.

4. The picking system according to claim 2, wherein a rotation axis of the rotor is horizontal.

5. The picking system according to claim 1, wherein an inclination of a rotation axis of the rotor is variable.

6. The picking system according to claim 2, wherein an inclination of a rotation axis of the rotor is variable.

7. The picking system according to claim 1, further comprising a second imager for capturing an image of a workpiece grasped by the chuck, wherein
the workpiece posture calculator recalculates a posture of the rotated workpiece on a basis of imaging data acquired from the second imager.

8. The picking system according to claim 2, further comprising a second imager for capturing an image of a workpiece grasped by the chuck, wherein
the workpiece posture calculator recalculates a posture of the rotated workpiece on a basis of imaging data acquired from the second imager.

9. The picking system according to claim 3, further comprising a second imager for capturing an image of a workpiece grasped by the chuck, wherein
the workpiece posture calculator recalculates a posture of the rotated workpiece on a basis of imaging data acquired from the second imager.

10. The picking system according to claim 4, further comprising a second imager for capturing an image of a workpiece grasped by the chuck, wherein
the workpiece posture calculator recalculates a posture of the rotated workpiece on a basis of imaging data acquired from the second imager.

11. The picking system according to claim 5, further comprising a second imager for capturing an image of a workpiece grasped by the chuck, wherein the workpiece posture calculator recalculates a posture of the rotated workpiece on a basis of imaging data acquired from the second imager.

12. The picking system according to claim 6, further comprising a second imager for capturing an image of a workpiece grasped by the chuck, wherein
the workpiece posture calculator recalculates a posture of the rotated workpiece on a basis of imaging data acquired from the second imager.

13. The picking system according to claim 1, wherein the posture changing device is a posture changing robot that includes, as the chuck, a robot hand connected to a robot arm and is capable of freely controlling a position and an angle, receives the workpiece taken out by the robot, and changes a posture of the received workpiece.

14. The picking system according to claim 2, wherein the posture changing device is a posture changing robot that includes, as the chuck, a robot hand connected to a robot arm and is capable of freely controlling a position and an angle, receives the workpiece taken out by the robot, and changes a posture of the received workpiece.

15. The picking system according to claim 3, wherein the posture changing device is a posture changing robot that includes, as the chuck, a robot hand connected to a robot arm and is capable of freely controlling a position and an angle, receives the workpiece taken out by the robot, and changes a posture of the received workpiece.

16. The picking system according to claim 4, wherein the posture changing device is a posture changing robot that includes, as the chuck, a robot hand connected to a robot arm and is capable of freely controlling a position and an angle, receives the workpiece taken out by the robot, and changes a posture of the received workpiece.

17. The picking system according to claim 5, wherein the posture changing device is a posture changing robot that includes, as the chuck, a robot hand connected to a robot arm and is capable of freely controlling a position and an angle, receives the workpiece taken out by the robot, and changes a posture of the received workpiece.

18. The picking system according to claim 6, wherein the posture changing device is a posture changing robot that includes, as the chuck, a robot hand connected to a robot arm and is capable of freely controlling a position and an angle, receives the workpiece taken out by the robot, and changes a posture of the received workpiece.

19. The picking system according to claim 7, wherein the posture changing device is a posture changing robot that includes, as the chuck, a robot hand connected to a robot arm and is capable of freely controlling a position and an angle, receives the workpiece taken out by the robot, and changes a posture of the received workpiece.

20. The picking system according to claim 8, wherein the posture changing device is a posture changing robot that includes, as the chuck, a robot hand connected to a robot arm and is capable of freely controlling a position and an angle, receives the workpiece taken out by the robot, and changes a posture of the received workpiece.

* * * * *